July 17, 1934.  C. P. SCHLEGEL  1,967,102
ENDLESS BELT AND METHOD OF MAKING SAME
Filed Sept. 28, 1931
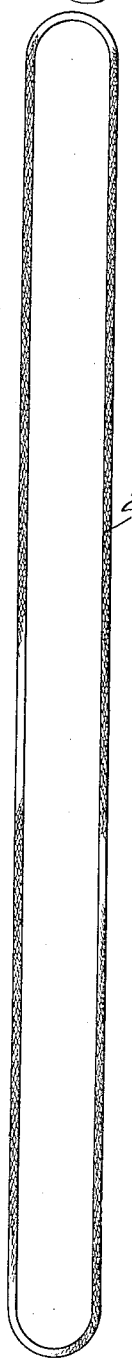
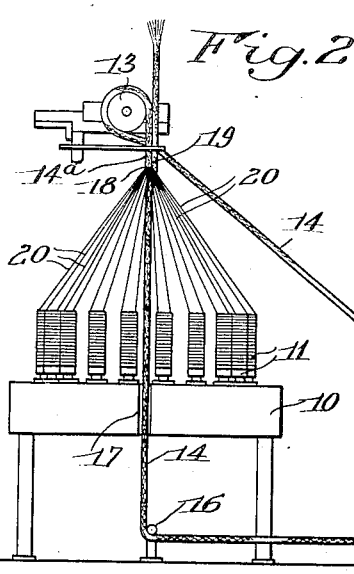
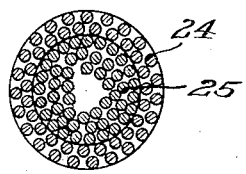
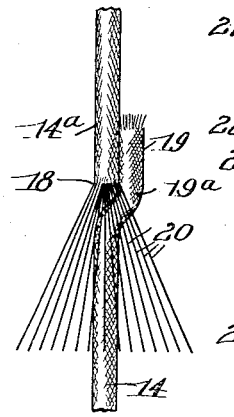
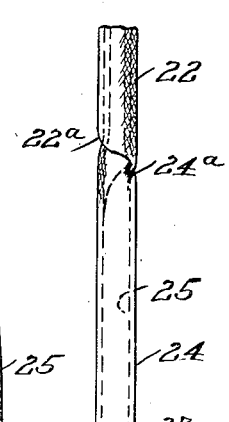
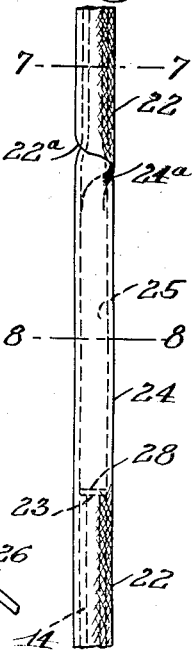
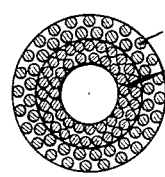
INVENTOR
Charles P. Schlegel
BY Edward H. Cumpston
his ATTORNEY Patented July 17, 1934

1,967,102

UNITED STATES PATENT OFFICE 1,967,102

ENDLESS BELT AND METHOD OF MAKING SAME

Charles P. Schlegel, Rochester, N. Y., assignor to The Schlegel Manufacturing Company, Rochester, N. Y., a corporation of New York Application September 28, 1931, Serial No. 565,543

4 Claims. (Cl. 96—25)

The present invention relates to endless belts or bands and has for its object to provide improvements in belts of this class and in the method of making the same to the end that a continuous belt of a plurality of sections is afforded with one or more tubular sections surrounding the initial or innermost section whereby to afford a continuous belt of uniform cross-section throughout.

A further object of the invention is to construct a belt of the present type by the process of forming and looping a section of flexible material of any desired length to afford an inner belt section and braiding threads or strands about said section to form thereon one or more surrounding sections whereby to produce a continuous braided belt.

A further object of the invention is to construct a continuous belt or band by the process of braiding threads or strands to form a tubular section of a somewhat greater length than the endless belt to be produced and positioning the initial end of the section at the braiding point and continuing to braid the strands about said section to form one or more surrounding sections thereon with the initial and final ends of the strands secured within the belt.

A further object of the invention is to provide a continuous band or belt in which an inner section of flexible material, which may be formed by braiding or otherwise, is surrounded by one or more tubular or braided sections forming a continuation of said first section whereby to afford a strong and durable belt of any desired length.

To these and other ends the invention resides in certain improvements and combinations of parts, all as will be hereinafter more fully described, the novel features being pointed out in the claims at the end of the specification.

In the drawing:

Fig. 1 is an endless belt constructed in accordance with the present invention;

Fig. 2 is a view in elevation illustrating somewhat diagrammatically one form of braiding machine for producing belts according to the present process;

Fig. 3 is a detail view illustrating the manner of positioning the free end of a looped belt section with respect to the braiding point whereby to permit the braiding process to be continued about said section to complete the belt;

Fig. 4 is a fragmentary view illustrating the ends of the inner and outer braided sections before the final end of the outer section is introduced into the inner section;

Fig. 5 is a view showing the joint between the ends of the inner and outer sections as it appears after the final end portion of the outer section has been positioned within the tubular portion of the belt and before cutting off the extremity of said final end portion projecting through the wall of the tubular section.

Fig. 6 is a view similar to Fig. 5 with said projecting extremity cut off and with the free ends of the strands tucked into the belt to complete the joint.

Fig. 7 is a transverse section on line 7—7 of Fig. 6 drawn to an enlarged scale, and Fig. 8 is a transverse section on line 8—8 of Fig. 6 drawn to an enlarged scale.

Similar reference numerals throughout the several views indicate the same parts.

The present belt or band is one which can be produced at a relatively low cost and which may have various usages either in the class of endless cables, driving belts or other forms of endless bands. One example of its use is that of a driving belt for dental engines, although it may be employed for driving other machines or used for other purposes.

Any suitable or well known type of braiding machine may be employed in the process of forming the tubular belt which is produced by the braiding of a selected number of threads or strands of any suitable material to form a continuous belt with the initial and final ends of the strands secured therein so that a smooth and continuous section is afforded throughout the length of the belt.

The table 10 of the machine shown in outline in Fig. 2 carries a suitable number of thread holding spools or spindles 11 having suitable means, not shown, for advancing and guiding the spools in the usual manner during the braiding operations. The table is slotted in any suitable manner, inwardly from its edge, to permit the initial end of the belt section to be carried upwardly therethrough to the braiding point and also to permit the belt to be withdrawn after it is completed.

In the initial braiding operation, a section of a considerable length is first produced and passed around a drum or roll 13, the braided end being held by the operator under tension until the braided section 14 has been formed slightly greater in length than the length of the endless belt or cable. The braided section is then looped around the yieldingly supported roll or guide 15 and the guide 16 beneath the machine and carried upwardly through the inwardly extending slot 17 of the table to a point adjacent the braiding point 18 where the free end 19 of the braided portion is passed between certain of the strands 20 and held at one side of the portion 14a of the tubular section 14, as shown in Figs. 2 and 3. The braiding operation is then continued and a bonding or binding action is afforded between the initial end portion of the section 14 and the threads braided thereon which is continued throughout the operation of forming one section upon another regardless of the number of layers or sections braided about the looped section 14.

Upon completion of the first outer section, indicated at 22, the portion 19 of the inner section 14 is cut off approximately at the point 19a and the remaining end portion of the section 14 is then tucked into the outer section 22 as indicated by the dotted line 23 in Fig. 4. The operation of cutting off the portion 19 and of positioning the remaining portion within the outer section 22 may be performed in advance of the completion of the braiding operation of the outer section if desired, but at any rate it is to be performed in advance of any attempt to braid an outer section upon the section 22, it being understood that each outer section braided upon the next succeeding section forms a continuation of the latter with the strands preferably being extended continuously from the initial end of the innermost section to the final end of the outermost section.

Upon braiding the outer section 22 to a predetermined point 22a in advance of the end 23 of the inner section the strands are preferably braided to afford an extended portion 25 somewhat longer than the unfilled tubular portion 24, as indicated in Fig. 4. The machine can be readily employed to braid the extended portion 25 of the outer loop section 22 by pulling that portion of the belt below the braiding point 18 outwardly between two of the strands 20 and through the slot 17 until said portion is moved outside of the circle of spools 11, in which position it is held while the machine is operated to complete the extension 25. Upon completion of the extension the strands are severed after which a suitable instrument is employed to introduce the portion 25 into the portion 24 substantially at the point 24a of the latter. Preferably a relatively large needle 26, such as a darning needle is used for this purpose, the extremity 25a of the portion 25 being threaded through the needle and the latter passed through said section 24 and brought out at a point adjacent the end 23 of the inner section 14 of the belt, as indicated in Fig. 5. The protruding portion is then cut off at 27 and the remaining ends of the strands pushed into the tubular portion 24 substantially into abutting relation with respect to the end 23 of the innermost section 14, as indicated by the dotted line 28 in Fig. 6, the result being the completed belt 29 shown in Fig. 1. By introducing the loose unbraided strands forming the end portion 25 within the tubular portion 24 of the belt, or by braiding the strands as shown and then positioning the part 25 within said tubular portion, the latter is filled out to correspond in diameter with the body of the tube as shown in Fig. 6.

If more than one section is to be braided about the inner section 14, the final ends of the strands of the last section to be braided will be introduced within the belt and secured in the same manner as the end portion 25 of the outer section 22.

In a belt constructed in accordance with the present method, in which both the initial and final ends of the strands are introduced and secured within the body of the belt, it is difficult to locate the point at which the joint afforded by said ends is formed or to find the point at which the final ends of the strands are introduced within the tubular section. The complete belt therefore has the appearance of being free from joints of any kind and is of uniform cross-sectional area throughout. The braiding of the threads of one section upon those of another affords an intimate binding or bonding action between the sections throughout the length of the belt so that there can be no slipping or relative movement of one section longitudinally of another, the result being in effect a unification of the several sections whereby to increase the strength and durability of the belt.

I claim:

1. The method of constructing belts of threads or strands, comprising the braiding of the strands to form a section of a predetermined length, looping said section and positioning the initial end portion thereof adjacent the point of braiding, forming a second section upon the first section by braiding the strands about said first section to a point somewhat in advance of the initial end portion of the first section, continuing the braiding from said point to form a free end portion at one side of the belt, severing the strands and positioning said free end portion within the belt to substantially fill that portion thereof between said point and said initial end portion whereby to cause said portion to correspond in diameter to that of the remaining portion of the belt.

2. The method of constructing belts of threads or strands wound upon separate spindles, comprising braiding the strands to form a section of a predetermined length, looping said section and positioning the initial end thereof adjacent the point of braiding forming one or more surrounding outer loop portions upon said section by continuing to braid the strands about the same and terminating the braiding at a point in advance of the initial end of the section, moving that portion of the belt containing the initial end of the section laterally and outwardly between two of the strands carried by the spindles, subsequently continuing the braiding from said point to form a free end portion at one side of the belt, severing the strands and inserting the end portion within that part of the belt lying between the braiding point and the initial end of said section.

3. As an article of manufacture, a continuous belt formed of a single flexible tubular member comprising an inner loop and a surrounding outer loop portion terminating at a point in spaced relation to the initial end of the inner loop, said outer loop portion having an integral extension comprising a single cord like portion of less diameter than said outer loop portion, said extension lying within that part of the tubular member extending between the initial end of the inner loop and the terminus of the outer loop portion and serving to expand said part whereby it is made to correspond substantially in shape and size to the remaining portion of the belt.

4. As an article of manufacture, a continuous belt comprising a single braided tubular member including an inner loop and a surrounding outer loop portion terminating in advance of the initial end of the inner loop and having an integral braided extension of less diameter than the outer loop portion, said braided extension entering the tubular member at the terminus of the outer loop portion and extending through said tubular member to and in substantially abutting relation with respect to the initial end of the inner loop.

CHARLES P. SCHLEGEL.